Aug. 7, 1956    L. E. BUSSEY ET AL    2,757,958
PORTABLE POWERED FIRE EXTINGUISHER
Filed April 1, 1952    2 Sheets-Sheet 1
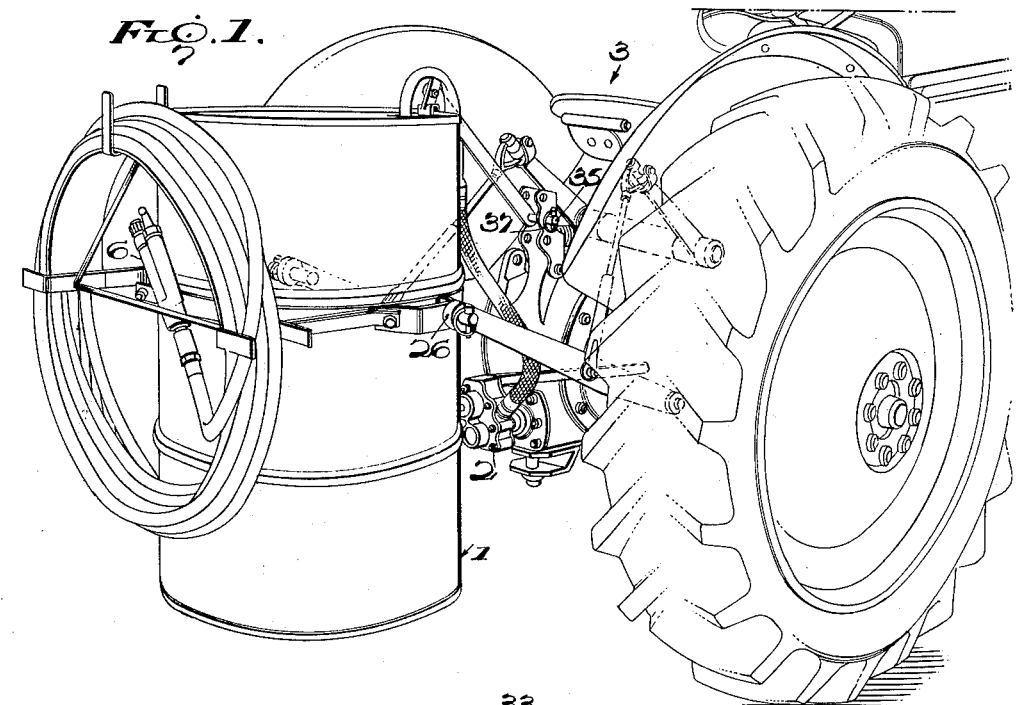
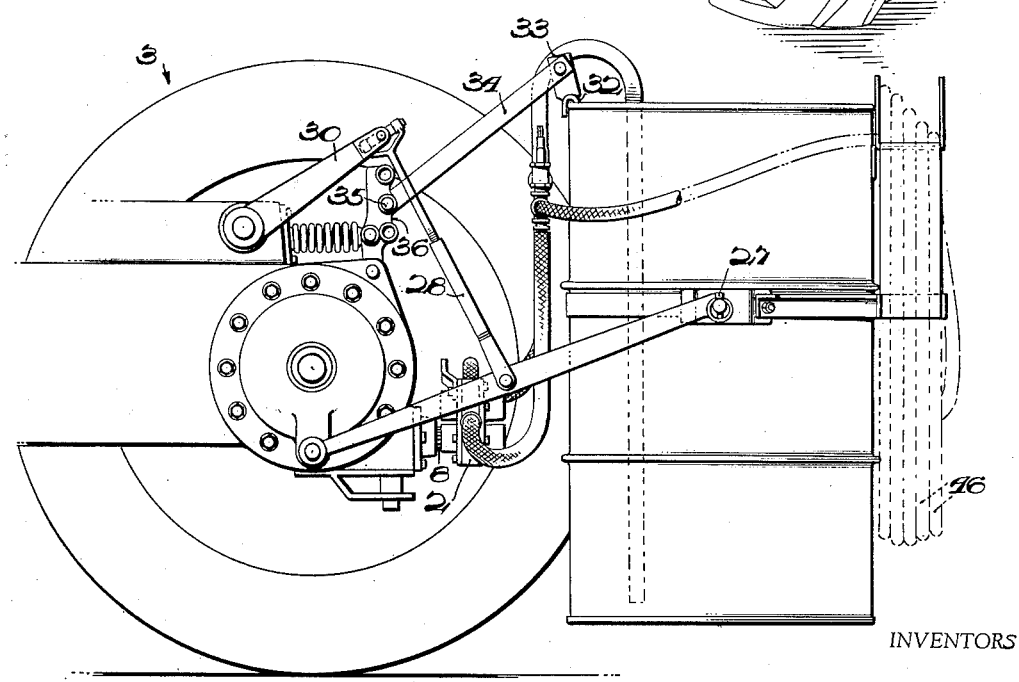
INVENTORS
*Lynn E. Bussey.*
*Lester E. Cox.*
BY
*Bacon + Thomas*, ATTORNEYS

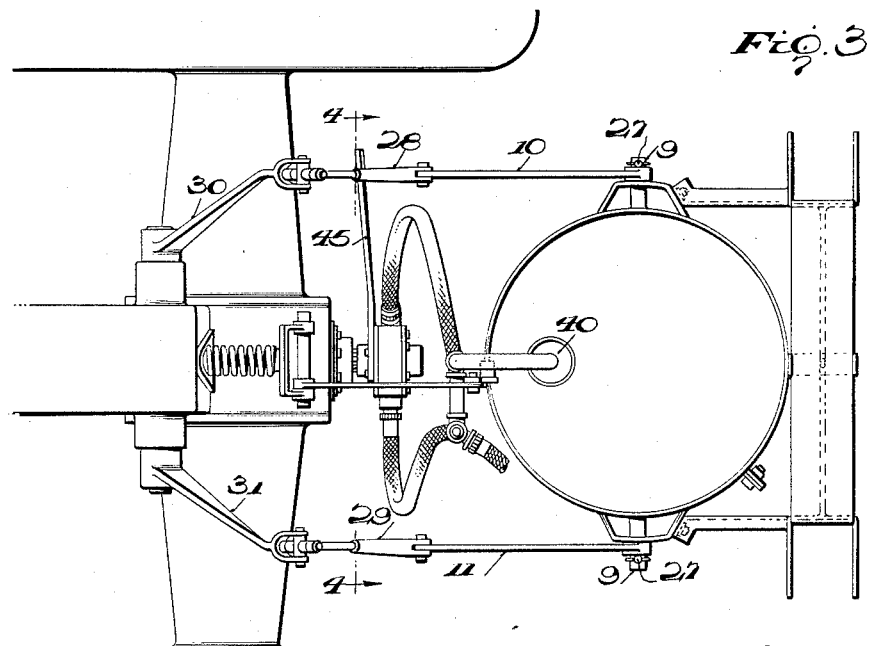
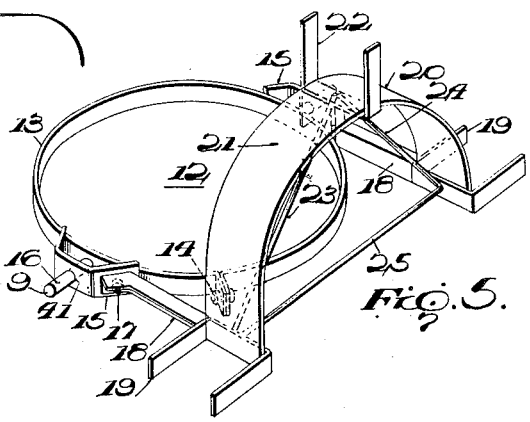
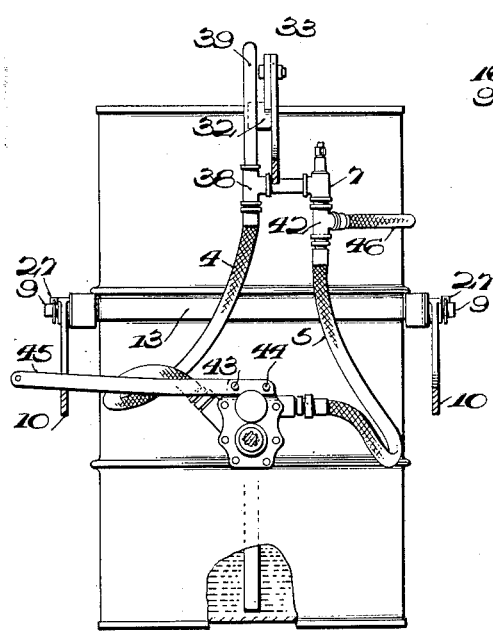

United States Patent Office 2,757,958
Patented Aug. 7, 1956

2,757,958
PORTABLE POWERED FIRE EXTINGUISHER

Lynn E. Bussey and Lester E. Cox, Springfield, Mo.

Application April 1, 1952, Serial No. 279,826

2 Claims. (Cl. 299—30)

This invention relates to portable power operated fire extinguishers, and more particularly, to a quick attachable unit for use with tractors or the like.

The primary object of the invention is the provision of an integral, self contained fire extinguisher which is quickly attachable to a standard farm tractor having lifting arms. The fire extinguisher unit may be stored complete with extinguisher fluid in a convenient location on farms, estates or the like, and in the event of fire may be rapidly attached to a standard lifting tractor and swiftly transported to the scene of the fire, where the unit may be immediately put into operation. It is an important object of the invention to provide an immediately available powered fire extinguisher without the necessity for permanently encumbering the tractor with auxiliary attachments of any sort.

An important feature of this invention resides in the combination of the entire unit with a tractor by means of a plurality of quick attachable connections which enable the tractor to lift, transport and operate the complete unit without the help of a specially trained operator.

A further object of the invention is the provision of a tank for containing a supply of extinguishing fluid, with a pump operatively connected to the tank and to a length of flexible hose terminating in a combination fog and straight stream nozzle, the hose being normally wound on a storage rack associated with the tank. According to the invention the tank is mounted on the tractor by a three point suspension system comprising diametrical trunnions and a top link. The pump is both driven by and mounted on the power take-off shaft of the tractor and includes in its hose system a pressure relief valve to prevent damage from excessive pump pressure.

Other objects and advantages of the invention will be apparent from the following detailed description having particular reference to the accompanying drawings, wherein like reference characters refer to like parts throughout the several views, and in which:

Fig. 1 is a perspective view of the entire apparatus attached to a farm tractor;

Fig. 2 is a side elevation of the extinguisher apparatus attached to a farm tractor and in the lifted position;

Fig. 3 is a top plan view of the apparatus with the hose removed from its storage rack;

Fig. 4 is a cross-sectional view on the line 4—4 of Fig. 3 in the direction of the arrows with part of the tank being broken away to show the lower end of the suction pipe;

Fig. 5 is a perspective view of the rack and trunnion subassembly.

Referring particularly to the drawings, the portable fire extinguisher comprises a tank 1 adapted to be charged with a fire extinguishing liquid, a gear type pump 2 mounted on the power take-off shaft 8 of a standard tractor indicated generally at 3, a suction hose 4, a discharge hose 5, a combination fog and straight stream nozzle 6 and a pressure relief valve 7. The tank 1 is supported by trunnions 9 which are received in self-aligning bearings 26 in the ends of the tractor lift arms 10 and 11. Trunnions 9 are attached as by welding to a hoop 13 which serves as a means of attaching to tank 1 the rack and trunnion subassembly, generally indicated at 12 in Fig. 5.

Referring particularly to Figs. 1 and 5, there is provided a split hoop 13 joined at its ends by a bolt 14 which is tightened after hoop 13 is placed in position on tank 1 to insure a rigid connection between the tank and the rack and trunnion subassembly. Attached to hoop 13 at diametrically opposite points are trunnions 9 and truncated V-shaped brackets 15. The brackets are attached to the hoop as by welding and contain apertures 41 which serve as additional support for the trunnions which pass therethrough. Each trunnion is provided at its end with a vertical hole 16 which cooperates to secure the trunnions to the lift arms in a manner to presently become apparent. Attached to corresponding legs of brackets 15 by means of bolts 17 are arms 18, shown in the illustrated embodiment as angle-iron, which terminate in welded or similar connections to U-shaped retainers 19. A semi-circular band 20 is joined to the inner surfaces of retainers 19, as by welding, and forms the base of a hose rack indicated generally at 21. Retainers 19, along with an additional U-shaped retainer 22, which is fastened to the top of the band 20, serve to retain the working hose 46 on the rack 21. Brace rods 23, 24 and 25 extend between the bases of the respective retainers 19 and 22 to lend rigidity to the rack structure and to serve also as a mount for nozzle 6 when the latter is not in use, as is best shown in Fig. 1. To this end the nozzle is inserted in the opening between the rearward side of the hoop 13 and rod 25, near one of the retainers 19, where said opening is relatively large. The nozzle is then slid inwardly toward the center of rod 25 where it is frictionally held between the rod and the hoop.

The tank 1 and its associated parts are mounted on the tractor by slipping the bearings 26 in lift arms 10 and 11 over trunnions 9 and securing the same in place by dropping pins 27 into the heretofore described holes 16. It will be appreciated that such attachment is both simple and quick. Lift arms 10 and 11 are then caused to raise the tank through the medium of drop links 28 and 29 and cranks 30 and 31 in a known manner.

Attached to the upper lip of tank 1, diametrically opposite the hose rack 21, is a welded or force-fitted, inverted U-clip 32, which has projecting upwardly therefrom an apertured lug 33. Pivotally attached to the lug 33 is one end of a link 34 which serves as the third point of attachment between the tank and the tractor and prevents the tank from rocking on the trunnions. The other end of link 34 is made fast to the tractor by means of a pin 35 passing through a hole in the end of the link and through aligned holes in a mounting bracket 36 which is furnished as part of the tractor. The pin 35 is secured by lock pin 37 in the same manner as the trunnions.

The gear type pump 2 is connected on its suction side through flexible hose 4 to one side of a T-connection 38. The other side of the T-connection engages suction pipe 39 which extends in inverted U-shape over the top of the tank lip and down through outlet opening 40 to a termination near the bottom of the tank as is best seen in Fig. 4. The third opening in the T-connection 38 is connected to the escape side of a pressure relief valve 7 which relieves dangerous pressures occurring in discharge hose 5 and in working hose 46, as for instance, when nozzle 6 is completely closed. Pump 2 is connected by means of discharge hose 5 and T-connection 42 to pressure relief valve 7 and to working hose 46.

As will be understood by those skilled in the art, any excess pressure of liquid in discharge hose 5 and working hose 46 will be vented or by-passed by the pressure relief valve 7 to the suction side of pump 2 and thence recirculated through the pump.

Pump 2 is constructed with a six-splined female shaft which mates and slidingly fits over the standard six-splined American Society of Agricultural Engineers power take-off shaft 8 which is found on all tractors. This sliding connection provides both a mounting to support the weight of the pump and a torque transmitting means for powering the pump. Attached to pump 2 by means of bolts 43 and 44 is a torque-bar 45 which in its operative position, when the pump is mounted on splined shaft 8, extends substantially horizontally toward the right lift arm 10. The outward end of the torque-bar rests on lift arm 10, as may best be seen in Fig. 1, and this prevents the pump casing from rotating when power is applied and also, by virtue of the inclined position of the lift arm, prevents the pump from working its way rearward off of splined shaft 8. It will be apparent that torque-bar 45 rests on lift arm 10 immediately forward of drop link 28 which provides further positive means for retaining the pump on the splined shaft and preventing its slipping off during operation.

When in storage with the tank filled and in readiness for use, it will be appreciated that the disclosed fire extinguisher comprises an integral unit ready for immediate and quick attachment to a tractor in the following manner:

The tractor 3 is backed up to the tank, the lift arms 10 and 11 are attached to the trunnions 9 and secured by pins 27, link 34 is secured to bracket 36 by pin 35 which is in turn made fast by lock pin 37, pump 2 is slid onto splined shaft 8 with torque-bar 45 in its proper horizontal position and the entire unit is ready for transportation to the scene of the fire where mere operation of the nozzle control will initiate the steady stream or fog, whichever is desired. The entire mounting operation can be completed in approximately one minute by an untrained operator and in even less time by one who has had some practice.

It is to be understood that the invention is not limited in its application to the specific details of construction and arrangement of parts illustrated in the drawings since it is capable of other embodiments which come within the scope of the following claims.

We claim:

1. For use with a farm tractor having lifting arms and a power take-off shaft; a portable, quick attachable, powered fire extinguishing unit comprising in combination, a tank with diametrically mounted trunnions, adapted to be engaged by said lifting arms, a pair of parallel arms extending rearwardly from adjacent said trunnions, a hose retaining member carried by each of said arms, a substantially semi-circular band supported by said hose retaining members, a third hose retaining member carried by said band intermediate said first-mentioned hose retainers, said hose retainers being adapted to retain a flexible working hose on said band and forming with said band a hose rack, a pump adapted to be powered by the power take-off shaft and be supported thereby, a flexible suction line extending from said tank to said pump, a flexible discharge line extending from said pump, a pressure relief valve connected between the two lines, a length of flexible working hose leading from the discharge line, and nozzle means connected with said working hose.

2. For use with a farm tractor having lifting arms and a power take-off shaft; a portable, powered fire extinguishing unit comprising in combination, a tank, a split hoop tightly encircling said tank, a pair of brackets mounted upon said hoop, a pair of trunnions disposed diametrically of said tank and secured to said band and extending through and partially supported by said brackets, said lifting arms being engageable with said trunnions for supporting said tank, a pair of parallel arms attached to said brackets and extending substantially tangentially away from said hoop, said arms at their outer ends terminating in substantially U-shaped retainers with the arms being secured to the closed end of said retainers, a substantially semi-circular band supported by said retainers, a third retainer carried by said band at a point intermediate said first-mentioned retainers, a rod extending between said first two retainers, and a second and third rod extending from the third retainer to the first and second retainers respectively, said retainers being adapted to retain a working hose on said band and forming therewith a rack for said working hose, a working hose, a separate pump adapted to be driven by the power take-off shaft, a flexible suction line extending from said tank to said pump, a flexible discharge line extending from said pump to one end of said working hose, a pressure relief valve connected between the two lines for by-passing liquid under excess pressure from said discharge line to said suction line, and a nozzle connected with the other end of said working hose.

References Cited in the file of this patent

UNITED STATES PATENTS

| | | |
|---|---|---|
| 934,123 | Wurmfeld | Sept. 14, 1909 |
| 1,239,625 | Ross | Sept. 11, 1917 |
| 1,694,574 | Witter et al. | Dec. 11, 1928 |
| 2,265,971 | Paul et al. | Dec. 9, 1941 |
| 2,492,547 | Willard | Dec. 27, 1949 |
| 2,565,587 | Boyett, Sr. | Aug. 28, 1951 |
| 2,599,448 | Hamilton et al. | June 3, 1952 |
| 2,608,327 | Bartling | Aug. 26, 1952 |
| 2,637,594 | Spedding | May 5, 1953 |